United States Patent
Takahashi et al.

(10) Patent No.: US 6,224,406 B1
(45) Date of Patent: May 1, 2001

(54) ROTATING CONNECTOR (75) Inventors: Seishi Takahashi; Takashi Oguma; Kazuya Kawamura, all of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/347,790

(22) Filed: Jul. 6, 1999

(51) Int. Cl.⁷ ................................................. H01R 3/00
(52) U.S. Cl. ............................................. 439/164; 439/15
(58) Field of Search ....................................... 439/164, 15

(56) References Cited

U.S. PATENT DOCUMENTS

| | | | |
|---|---|---|---|
| 4,540,223 | * | 9/1985 | Schmerda et al. ............... 439/3 S |
| 4,744,763 | * | 5/1988 | Suzuki et al. ................... 439/15 |
| 5,588,854 | * | 12/1996 | Ikumi et al. .................... 439/164 |

FOREIGN PATENT DOCUMENTS 0 770 521 A1    5/1997   (EP) .

* cited by examiner

*Primary Examiner*—Paula Bradley
*Assistant Examiner*—James R. Harvey
(74) *Attorney, Agent, or Firm*—Brinks Hofer Gilson & Lione (57) ABSTRACT

A rotating connector including a movable body having a lower holder with an outer extension portion which faces a widthwise direction end of a flexible cable. The flexible cable has a connecting end portion which extends beyond the outer extension portion and which is connected to a stationary side connecting portion of a first housing. For example, a cutout is formed in the flexible cable to prevent an edge of the connecting end portion of the flexible cable and the outer extension portion from contacting each other at a location where they cross each other. Using a simple structure, the rotating connector which makes it possible to reduce the level of sliding noise produced when sliding occurs between the flexible cable and the outer extension portion of the lower holder of the movable body.

8 Claims, 7 Drawing Sheets

ROTATING CONNECTOR

BACKGROUND OF THE INVENTION

1. Field of the Invention

The present invention relates to a rotating connector which is incorporated in a steering system of an automobile and which is used as electrical connecting means for an air bag system or the like.

2. Description of the Related Art

Rotating connectors are formed by connecting a pair of housings, which are concentrically and relatively rotatably coupled to each other, through a belt-like flexible cable. They are roughly categorized into two types depending on the way in which the flexible cable is wound. In the first type, the flexible cable is wound like a whirl in an annular accommodating portion defined by the pair of housings. In the second type, the flexible cable is wound in a reverse direction in the accommodating portion. In the second type, the required length of the flexible cable can be made shorter. Therefore, the second type has the advantage of reduced total costs.

However, in conventional rotating connectors, when the flexible cable is subjected to vibrations from the automobile and moves vertically in the accommodating portion, both widthwise direction ends of the flexible cable collide with the upper case and the lower cover of the first housing, resulting in the generation of noise unpleasant to the ear.

To try to solve this problem, the applicant proposed a rotating connector in European Patent Publication No. EP0770521A1. The rotating connector comprises a first housing and a second housing concentrically and relatively rotatably coupled together; a belt-like flexible cable which is wound in a reverse direction through an annular accommodating portion defined by the housings, with both ends of the flexible cable being secured to the housings; and a movable body which is rotatably disposed in the accommodating portion and which has a hole through which the turning portion of the flexible cable passes. In the rotating connector, an outer extension portion is formed at the movable body so as to oppose the widthwise direction ends of the flexible cable. The flexible cable is held down at the outer extension portion to reduce the noise level.

Figure 9:
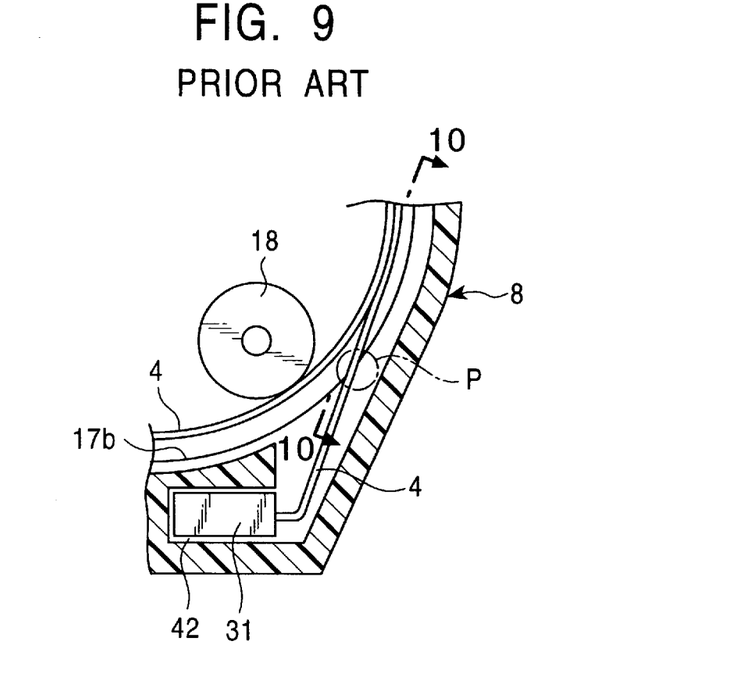
FIG. 9 is a partial plan view showing in section a portion of the first housing side connecting portion of the flexible cable in the rotating connector proposed by the applicant.
Figure 10:
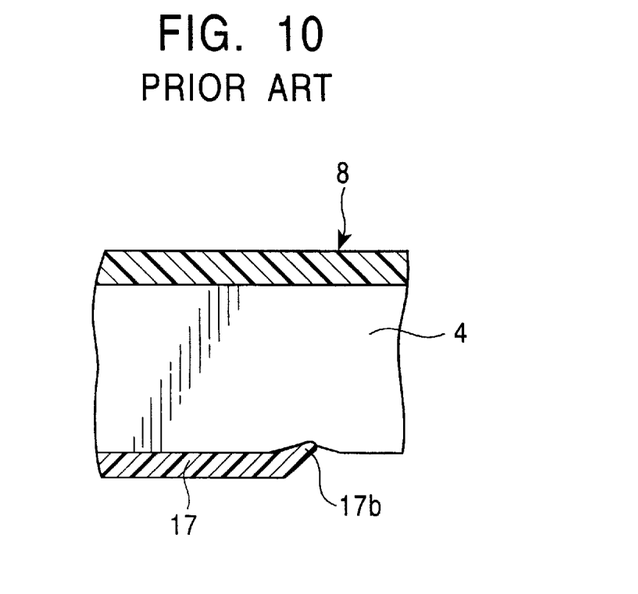
FIG. 10 is a sectional view taken on line 10—10 of FIG. 9.

FIG. 9 is a partial plan view showing in section a portion of the first housing side connecting portion of the flexible cable of the proposed rotating connector. FIG. 10 is a sectional view taken on line 10—10 of FIG. 9.

As shown in FIG. 9, a flexible cable 4 crosses at point P an outer extension portion 17b of a lower holder 17 (see FIG. 10) of a movable body, and extends up to a stationary side connecting portion 31 provided at an upper case 8 (see FIG. 10) of a first housing. A connecting end portion of the flexible cable 4 is secured to the stationary side connecting portion 31. Reference numeral 18 denotes a roller of the movable body.

However, in this structure, the outer extension portion 17b of the lower holder 17 contacts an edge of the flexible cable 4 at point P (of FIG. 9), as shown in FIG. 10. Therefore, when sliding occurs at the portion where they contact each other, noise is generated.

SUMMARY OF THE INVENTION

Accordingly, in view of the above-described conventional problem, it is an object of the present invention to provide a rotating connector with a simple structure which prevents the production of noise resulting from sliding between the flexible cable and the outer extension portion of the lower holder of the movable body.

To this end, according to the present invention, there is provided a rotating connector comprising:

a first housing and a second housing, which are concentrically and relatively rotatably coupled to each other;

a belt-like flexible cable which is wound in a reverse direction through a turning portion in an annular accommodating portion defined by the first housing and the second housing, with both ends of the flexible cable being fixed to the first housing and the second housing; and a movable body which is rotatably disposed in the accommodating portion, the movable body having an opening through which the turning portion of the flexible cable passes;

wherein the movable body has an outer extension portion which faces a widthwise direction end of the flexible cable;

wherein a connecting end portion of the flexible cable crosses the outer extension portion of the movable body in order to be connected to a stationary side connecting portion of the first housing; and wherein an edge of the connecting end portion of the flexible cable and the outer extension portion of the movable body are disposed so as not to contact each other at a crossing location of the edge of the connecting end portion of the flexible cable and the outer extension portion of the movable body.

In a preferred form, the edge of the connecting end portion of the flexible cable may have a cutout formed therein to prevent the edge of the connecting end portion of the flexible cable and the outer extension portion of the movable body from contacting each other.

In another preferred form, the edge of the connecting end portion of the flexible cable may be lifted by a portion of the first housing to prevent the edge of the connecting end portion of the flexible cable and the outer extension portion of the movable body from contacting each other.

In still another preferred form, the edge of the connecting end portion of the flexible cable may be lifted by the stationary side connecting portion of the first housing to prevent the edge of the connecting end portion of the flexible cable and the outer extension portion of the movable body from contacting each other.

In still another preferred form, an end of the outer extension portion may extend upward.

In still another preferred form, when an end of the outer extension portion extends upward, the edge of the connecting end portion of the flexible cable may have a cutout formed therein to prevent the edge of the connecting end portion of the flexible cable and the outer extension portion of the movable body from contacting each other.

In still another preferred form, when an end of the outer extension portion extends upward, the edge of the connecting end portion of the flexible cable may be lifted by a portion of the first housing to prevent the edge of the connecting end portion of the flexible cable and the outer extension portion of the movable body from contacting each other.

In still another preferred form, when an end of the outer extension portion extends upward, the edge of the connecting end portion of the flexible cable may be lifted by the stationary side connecting portion of the first housing to prevent the edge of the connecting end portion of the flexible cable and the outer extension portion of the movable body from contacting each other.

DESCRIPTION OF THE PREFERRED EMBODIMENTS

According to the present invention, the moving connector is constructed so as to eliminate the problem of an edge of a connecting end portion of a flexible cable and an outer extension portion of a movable body contacting each other at the portion where they cross. This is achieved by forming a cutout in an edge of the connecting end portion of the flexible cable, or by lifting an edge of the connecting end portion of the flexible cable by a portion of the first housing, or by lifting an edge of the connecting end portion of the flexible cable by a stationary side connecting portion of the first housing. Therefore, a simple structure can be used to completely solve the problem of noise generation resulting from sliding between an edge of the connecting end portion of the flexible cable and the outer extension portion of the movable body.

Figure 1:
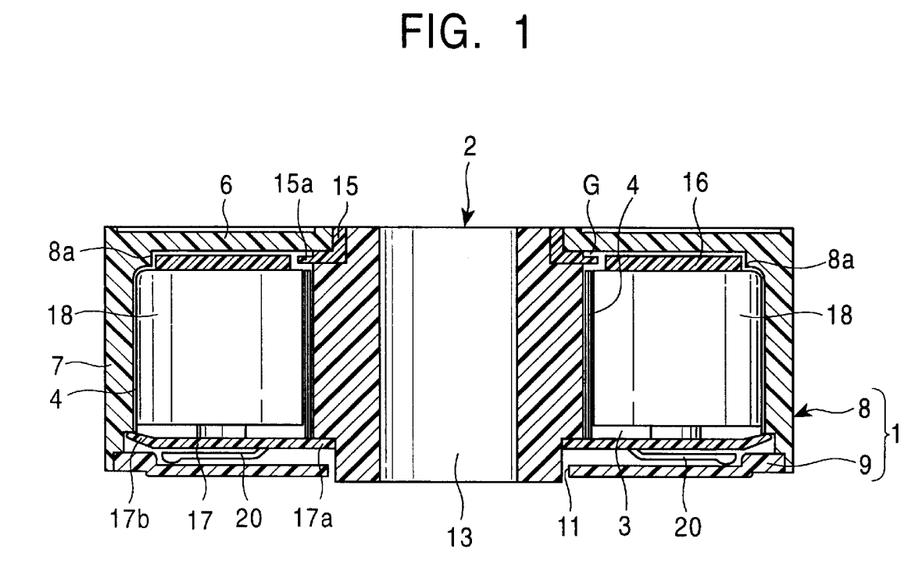
FIG. 1 is a sectional view of a first embodiment of the rotating connector in accordance with the present invention.
Figure 2:
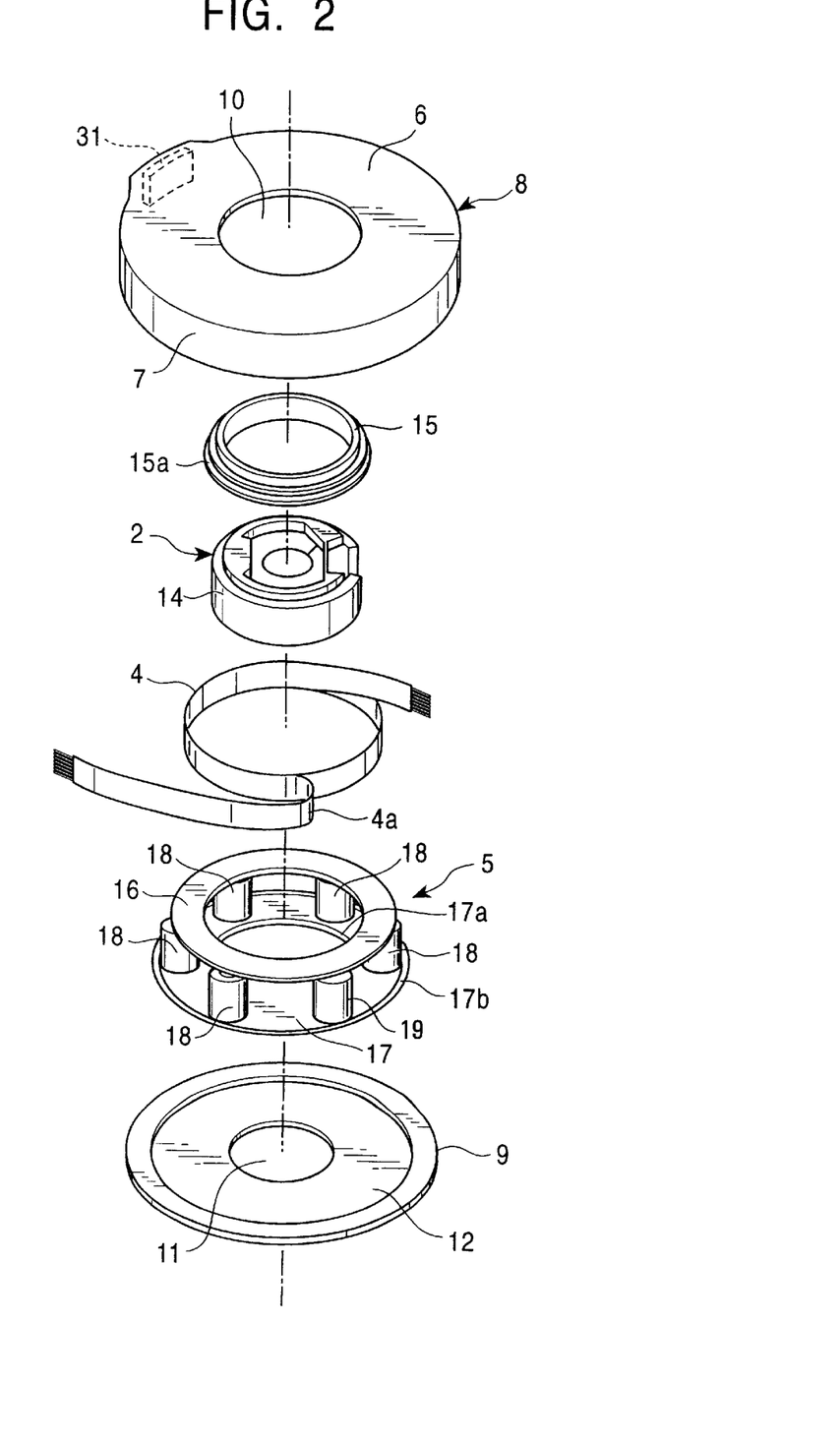
FIG. 2 is an exploded perspective view of the rotating connector of FIG. 1.

A description will now be given of preferred embodiments of the rotating connecting of the present invention, with reference to the drawings. FIG. 1 is a sectional view of a first embodiment of the rotating connector. FIG. 2 is an exploded perspective of the rotating connector of FIG. 1.

As shown in these figures, the rotating connector roughly comprises a first housing 1; a second housing 2 rotatably attached to the first housing 1; a flexible cable 4 wound in an annular accommodating portion 3 defined by the housings 1 and 2; and a movable body 5 rotatably disposed in the accommodating portion 3.

The first housing 1 comprises an upper case 8 having an outer tube portion 7 extending vertically downward from the outer peripheral edge of a top board 6; and a lower cover 9 that is integrally joined to the bottom end of the outer tube portion 7. An reshaped curved portion 8a is formed in a portion at which the top board 6 and the outer tube portion 7 in an inner wall of the upper case 8 are linked together.

Center holes 10 and 11 are formed in the center portions of the top board 6 of the upper case 8 and the lower cover 9, respectively. An annular guide recess 12 is formed in the bottom surface of the lower cover 9. The second housing 2 is a tubular body having a shaft insertion hole 13 in the central portion thereof. The outer peripheral surface thereof is an inner tube portion 14.

An annular sliding cap 15 is closely interposed between the top outer peripheral edge of the second housing 2 and the center hole 10 of the upper case 8. The housings 1 and 2 are rotatably coupled to each other by the sliding cap 15 acting as a sliding portion. The sliding cap 15 is molded from a type of synthetic resin which is different from the type of synthetic resin used to form the housings 1 and 2. A thin flange portion 15a is formed at the bottom outer peripheral surface of the sliding cap 15. The accommodating portion 3 is defined by the top board 6, the outer tube portion 7, and the lower cover 9, of the first housing 1, and the inner tube portion 14 of the second housing 2. In the accommodating portion 3, a gap G is formed between the flange 15a of the sliding cap 15 and the top board 6.

The flexible cable 4 is a belt-like, flat cable, which is formed by laminating parallel conductors with a pair of insulating films. Both ends of the flexible cable 4 are secured to the outer tube portion 7 and the inner tube portion 14, respectively, and are then drawn out from the first housing 1 and the second housing 2, respectively. In the accommodating portion 3, the flexible cable 4 is wound clockwise along the inner wall of the outer tube portion 7. Then, the portion of the flexible cable 4 wound clockwise is wound into a U-shape to reverse its winding direction, by forming a turning portion 4a. Thereafter, the flexible cable 4 is wound counterclockwise around the outer wall of the inner tube portion 14.

The moving body 5 comprises an annular upper holder 16 and an annular lower holder 17, which oppose each other and are separated by a predetermined distance; a plurality of rollers 18 axially supported between the holders 16 and 17; and one stationary tube 19 fixed between the holders 16 and 17. A plurality of elastic arms 20 are integrally molded to the bottom surface of the lower holder 17. The lower holder 17 has a larger width than the upper holder 16 in a diametrical direction thereof. An inner extension portion 17a and an outer extension portion 17b, which are formed at both peripheral edges of the lower holder 17, protrude beyond the rollers 18 and the stationary tube 19.

The movable body 5 is disposed in the accommodating portion 3, and each elastic arm 20 slides on the guide recess 12 of the lower cover 9, whereby the movable body 5 is rotatably guided in a diametrical direction of the accommodating portion 3. Here, the turning portion 4a of the flexible cable 4 passes through an opening between the stationary tube 19 and one of the rollers 18, and is looped around this roller 18. The inner winding portion of the flexible cable 4 is held between the flange portion 15a of the sliding cap 15 and the inner extension portion 17a of the lower holder 17. On the other hand, the outer winding portion of the flexible cable 4 is held between the curved portion 8a of the upper case 8 and the outer extension portion 17b of the lower holder 17.

A description will now be given of the operation of the rotating connector in the case where the first housing 1 is used as stationary body, and the second housing 2 is used as movable body. In this case, the housing 1 is fixed to a steering column side of the steering system, while the second housing 2 is coupled to a steering shaft, a steering wheel, or the like.

During use of the rotating connector, when the steering wheel is turned either clockwise or counterclockwise, the torque thereof is transmitted to the second housing 2, causing it to rotate either clockwise or counterclockwise.

For example, when the second housing 2 is rotated clockwise from a position corresponding to the neutral position of the steering wheel, the turning portion 4a of the flexible cable 4 is rotated by an amount which is slightly less than the amount of rotation of the second housing 2. One of the rollers 18 is then pulled by the turning portion 4a, causing the movable body 5 to move clockwise with the movement of the turning portion 4a. The flexible cable 4 is drawn out of the outer tube portion 7 by a length whose value is about twice the value of the amount of movement of the turning portion 4a and the movable body 5. Then, it is wound around the peripheral surface of the inner tube portion 14.

In contrast to this, when the second housing 2 is rotated counterclockwise from the position corresponding to the neutral position of the steering wheel, the turning portion 4a of the flexible cable 4 moves counterclockwise by an amount which is slightly less than the amount of rotation of the second housing 2. The turning portion 4a moves away from the roller 18 and pushes the stationary tube 19, causing the movable body 5 to move counterclockwise with the movement of the turning portion 4a. The flexible cable 4 is drawn out of the inner tube portion 14 by a length whose value is about twice the value of the amount of movement of the turning portion 4a and the movable body 5. Then, it is rewound around the outer tube portion 7.

During the operation, the sliding cap 15 is closely interposed between the rotational sliding portions of the housings 1 and 2, making it possible to greatly reduce the noise level resulting from sliding when the second housing 2 is rotated.

When a vertical force (namely, a force in the axial direction of the steering shaft) acts on the flexible cable 4 due to vibrations transmitted from the automobile, the flexible cable 4 tries to move vertically in the accommodating portion 3. However, in the rotating connector, the widthwise direction ends of the inner winding portion of the flexible cable 4 face the flange portion 15a of the sliding cap 15 and the inner extension portion 17a of the outer holder 17. Therefore, even when both widthwise direction ends of the flexible cable 4 collide with the flange portion 15a and the inner extension portion 17a, sliding noise is absorbed by the sliding cap 15 and the lower holder 17. Particularly in the case where a predetermined gap G is formed between the flange portion 15a of the sliding cap 15 and the top board 6, the sliding cap 15 is highly effective in absorbing sliding noise, making it possible to virtually eliminate the problem of sliding noise (caused by the flexible cable 4) leaking from the housings 1 and 2. This is because the flange portion 15a warps in the gap G.

The elastic arms 20 are provided at the bottom surface of the lower holder 17. Therefore, even when the flexible cable 4 collides with the lower holder 17, the flexible cable is elastically caught by the lower holder 17, making the sliding noise particularly small.

The widthwise direction ends of the outer winding portion of the flexible cable 4 face the curved portion 8a of the upper case 8 and the outer extension portion 17b of the lower holder 17. The direction in which the top end of the flexible cable 4 collides with the upper case 8 is gradually changed by the curved portion 8a. In addition, the bottom end of the flexible cable 4 is prevented from colliding with the lower cover 9 by the outer extension portion 17b. In order to reduce the size of the space in which the flexible cable 4 moves vertically, and to elastically catch the flexible cable 4, the outer extension portion 17b is formed such that an end thereof extends upward and gradually becomes thinner. Therefore, sliding noise produced from the outer winding portion of the flexible 4 can be reduced and prevented from leaking outward from the housings 1 and 2.

Figure 3:
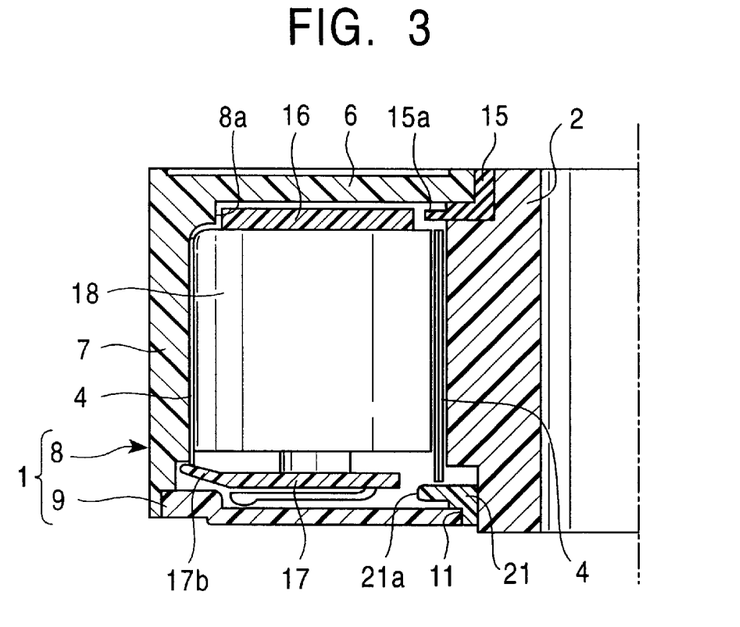
FIG. 3 is a half sectional view of a second embodiment of the rotating connector In accordance with the present invention.

FIG. 3 is a half sectional view of a second embodiment of the rotating connector in accordance with the present invention. In the figure, component parts corresponding to those of FIG. 1 are given the same reference numerals. The second embodiment is different from the first embodiment in that the inner extension 17a of the lower holder 17 is omitted; that, in addition to the sliding cap 15, a sliding cap 21 similar to the sliding cap 15 is closely interposed between the bottom outer peripheral edge of the second housing 2 and a center hole 11 of the lower cover 9; and that a flange portion 21a of the sliding cap 21 is disposed so as to face the widthwise direction bottom end of the flexible cable 4. The other structural features of the rotating connector of the second embodiment are basically the same as those of the rotating connector of the first embodiment.

When the housings 1 and 2 are rotatably coupled to each other through the sliding caps 15 and 21, the second housing 2 can rotate smoothly, and sliding noise produced when the second housing 2 is rotated can be further reduced. Since the flange portions 15a and 21a of their respective sliding caps 15 and 21 face both widthwise direction ends of the inner winding portion of the flexible cable 4, the flexible cable 4 is elastically held by the flange portions 15a and 21a. Therefore, the sliding noise produced when the flexible cable 4 collides with the flange portions 15a and 21a can be virtually completely eliminated.

Figure 4:
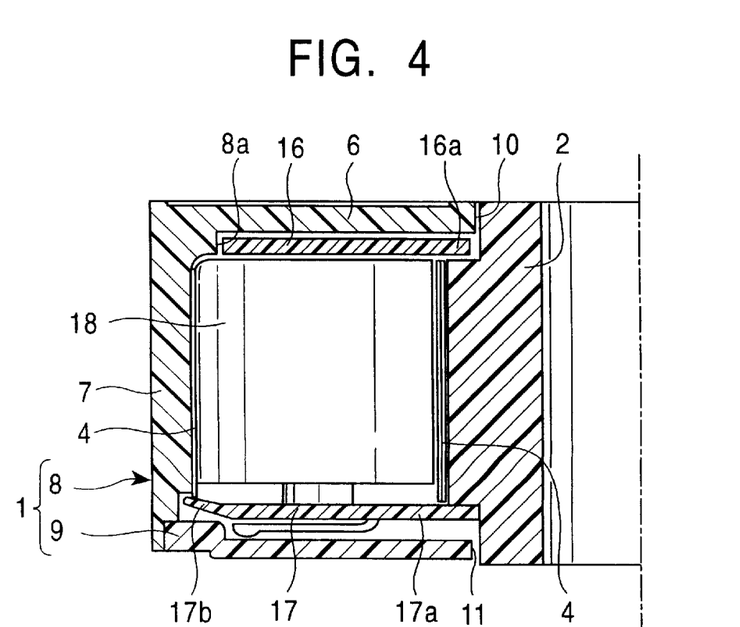
FIG. 4 is a half sectional view of a third embodiment of the rotating connector in accordance with the present invention.

FIG. 4 is a half sectional view of a third embodiment of the rotating connector in accordance with the present invention. In this figure, corresponding parts to those of FIG. 1 are given the same reference numerals. The third embodiment differs from the first embodiment in that the sliding cap 15 is omitted, that an inner extension portion 16a is formed at the upper holder 16 so as to protrude further inward than the rollers 18 and the stationary tube 19; and that both widthwise direction ends of the flexible cable 4 are held between the inner extension portion 16a and the inner extension portion 17a of the lower holder 17. The other structural features are basically the same.

In this case, the inward extension portions 16a and 17a of the holders 16 and 17 face both widthwise direction ends of the inner winding portion of the flexible cable 4, so that the flexible cable 4 does not collide directly with the top board 6 of the upper case 8 and the lower cover 9, making it possible to reduce sliding noise.

Figure 5:
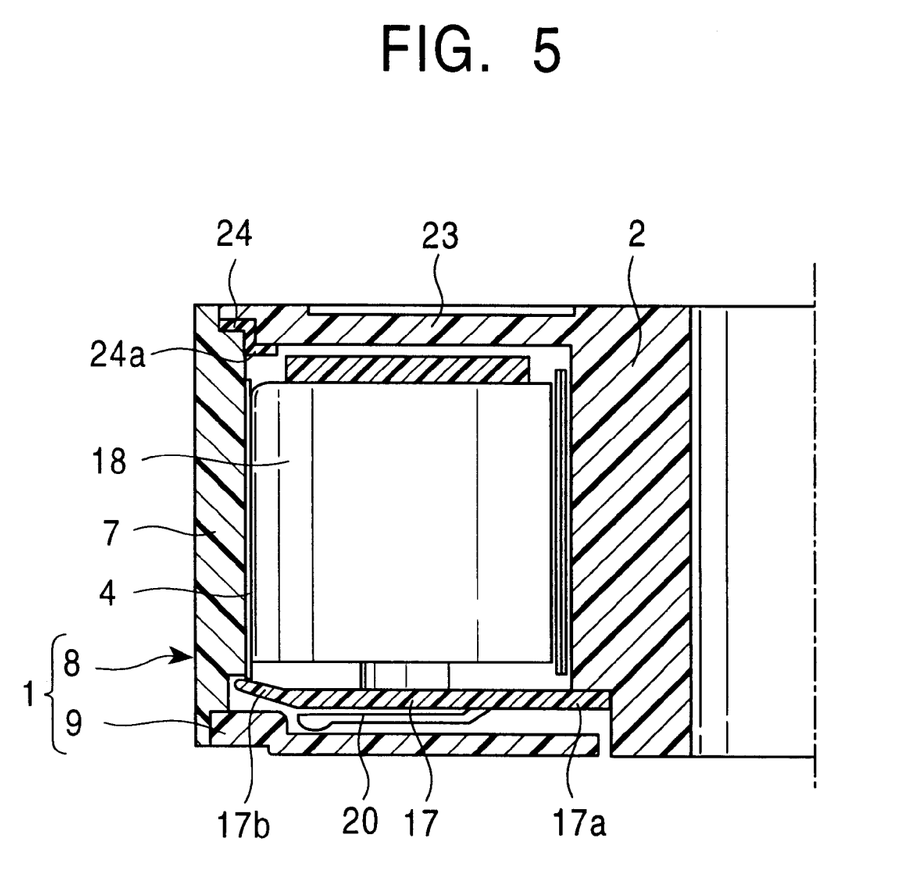
FIG. 5 is a half sectional view of a fourth embodiment of the rotating connector in accordance with the present invention.

FIG. 5 is a half sectional view of a fourth embodiment of the rotating connector in accordance with the present invention. In the figure, corresponding parts to those of FIG. 1 are given the same reference numerals. The fourth embodiment differs from the first embodiment in that the top board defining the accommodating portion 3 is formed by a flange portion 23 integrally molded to the top end of the second housing 2; and that a sliding cap 24 with a flange portion 24a is interposed between the outer peripheral edge of the flange portion 23 and the top end of the outer tube portion 7. The other structural features are basically the same.

The rotational sliding portions of the housings 1 and 2 can be modified when necessary. In the fourth embodiment, the flange portion 24a of the sliding cap 24 and the outer extension portion 17b of the lower holder 17 face both widthwise direction ends of the outer winding portion of the flexible cable 4. Therefore, even when, by any chance, the widthwise direction ends of the flexible cable 4 collide with the flange portion 24a and the outer extension portion 17b, the sliding noise, produced by the collision, is absorbed by the sliding cap 15 and the lower holder 17, making it possible to reduce the sliding noise level.

In the embodiments, the first housing 1 acted as the stationary body, and the second housing 2 acted as the movable body. However, the first housing 1 can act as the movable body, and the second housing 2 can act as the stationary body.

Although in the embodiments noise reduction means, such as the flange portion 15a of the sliding cap 15, the flange portion 21a of the sliding cap 21, and the flange portion 24a of the sliding cap 24, as well as the extension portion 16a of the holder 16, and the extension portions 17a and 17b of the holder 17, are disposed at the top and bottom ends of the inner winding portion and the outer winding portion of the flexible cable 4, these noise reduction means may be employed in suitable combinations. For example, instead of using the sliding cap 24 and the inner extension portion 16a of the upper holder 16, an air-gap may be provided within the top board 6 of the upper case 8. In this case, sliding noise produced when the top end of the flexible cable 4 collides with the top board 6 can be reduced. Alternatively, one or a plurality of noise reduction means may be used.

Specific examples will be given of structures for preventing the outer extension portion 17b of the lower holder 17 and an edge of the connecting end portion of the flexible cable 4 from contacting each other (at location P in FIG. 9).

Figure 6:
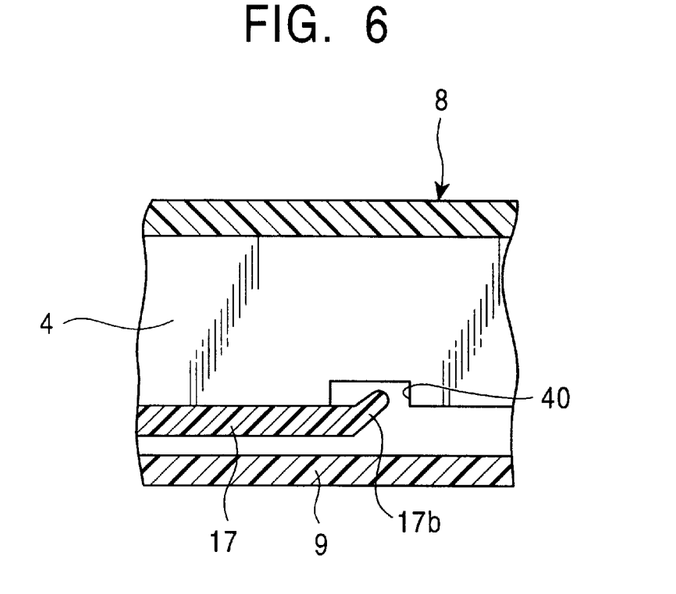
FIG. 6 illustrates the relationship between the flexible cable and the outer extension portion, in a first specific example.

FIG. 6 illustrates the relationship between the flexible cable and the outer extension portion, in one specific example. In this example illustrated in FIG. 6, a cutout 40 is formed in an edge of the connecting end portion of the flexible cable 4. The cutout 40 prevents the flexible cable 4 and the outer extension portion 17b of the lower holder 17 from contacting each other, thereby preventing sliding noise, produced as a result of sliding between the flexible cable 4 and the outer extension portion 17b of the lower holder 17, from being produced.

Figure 7:
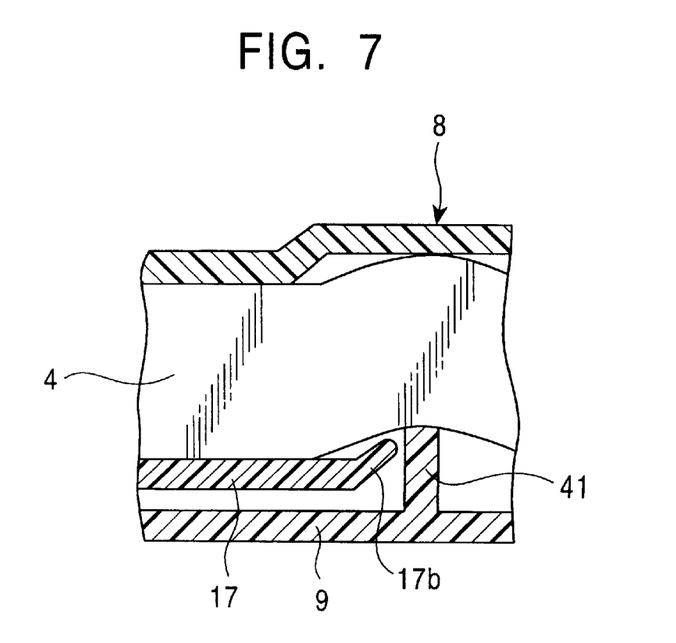
FIG. 7 shows a structure for preventing the flexible cable and the outer extension portion from contacting each other, in a second specific example.

FIG. 7 illustrates a structure for preventing the flexible cable and the outer extension portion from contacting each other, in a second specific example. In this specific example shown in FIG. 7, an edge of the connecting end portion of the flexible cable 4 is lifted by a portion of the first housing 1, or more specifically by an upstanding portion 41 standing erect at the outer periphery of the lower cover 9. The upstanding portion 41 prevents the flexible cable 4 and the outer extension portion 17b of the lower holder 17 from contacting each other, thereby preventing sliding noise, produced as a result of sliding between the flexible cable 4 and the outer extension portion 17b of the lower holder 17, from being generated.

Figure 8:
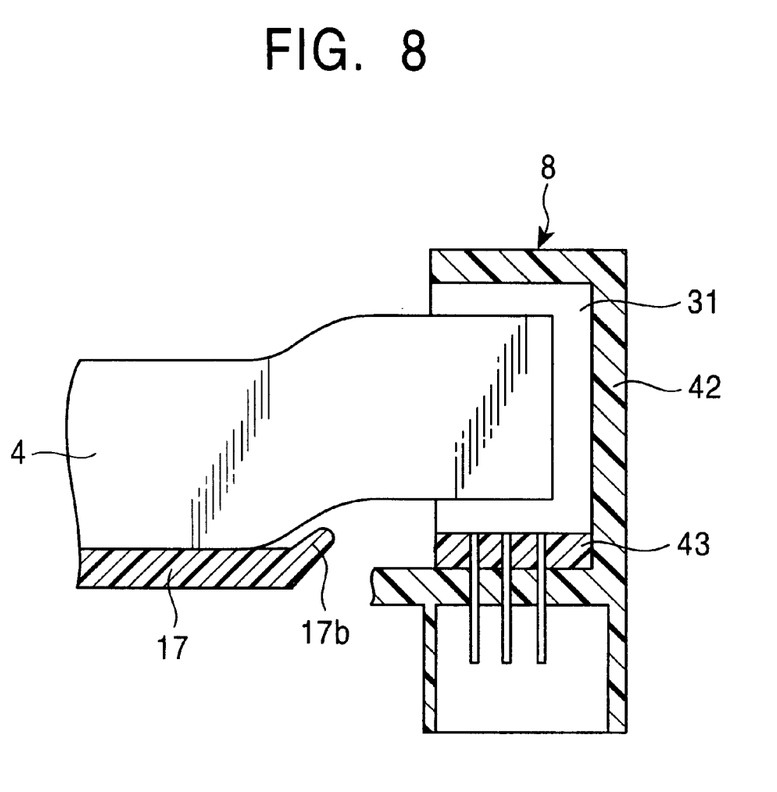
FIG. 8 shows another structure for preventing the flexible cable and the outer extension portion from contacting each other, in a third specific example.

FIG. 8 illustrates another structure for preventing the flexible cable and the outer extension portion from contacting each other, in a third specific example. In this example shown in FIG. 8, an edge of the connecting end portion of the flexible cable 4 is lifted by the stationary connecting portion 31 in the upper case 8 of the first housing 1. The stationary connecting portion 31 is accommodated in the connecting portion accommodating space 42 in the upper case 8, and a spacer 43 is disposed below the stationary connecting portion 31. The spacer 43 causes the edge of the connecting end portion of the flexible cable 4 to be lifted upward so that the flexible cable 4 and the outer extension portion 17b of the lower holder 17 do not contact each other. Therefore, the level of the sliding noise, produced as a result of sliding between the flexible cable 4 and the outer extension portion 17b, can be reduced.

According to the present invention, the moving connector is constructed so as to eliminate the problem of an edge of a connecting end portion of a flexible cable and an outer extension portion of a movable body contacting each other at the portion where they cross. This is achieved by forming a cutout in an edge of the connecting end portion of the flexible cable, or by lifting an edge of the connecting end portion of the flexible cable by a portion of the first housing, or by lifting an edge of the connecting end portion of the flexible cable by a stationary side connecting portion of the first housing. Therefore, a simple structure can be used to completely solve the problem of noise generation resulting from sliding between an edge of the connecting end portion of the flexible cable and the outer extension portion of the movable body.

What is claimed is:

1. A rotary connector comprising:

a first housing and a second housing, which are concentrically and relatively rotatably coupled to each other;

a belt-like flexible cable which is wound in a reverse direction through a turning portion in an annular accommodating portion defined by the first housing and the second housing, with a first end of the flexible cable being fixed to the first housing and a second end of the flexible cable being fixed to the second housing; and a movable body which is rotatably disposed in the accommodating portion, the movable body having an opening though which the turning portion of the flexible cable passes;

wherein the movable body has an outer extension portion which faces a widthwise direction end of the flexible cable;

wherein a connecting end portion of the flexible cable crosses the outer extension portion of the movable body to be connected to a stationary side connecting portion of the first housing; and wherein an edge of the connecting end portion of the flexible cable and the outer extension portion of the movable body are disposed so as not to contact each other at a crossing location of the edge of the connecting end portion of the flexible cable and the outer extension portion of the movable body.

2. A rotating connector according to claim 1, wherein the edge of the connecting end portion of the flexible cable has a cutout formed therein to prevent the edge of the connecting end portion of the flexible cable and the outer extension portion of the movable body from contacting each other.

3. A rotating connector according to claim 1, wherein the edge of the connecting end portion of the flexible cable is lifted by a portion of the first housing to prevent the edge of the connecting end portion of the flexible cable and the outer extension portion of the movable body from contacting each other.

4. A rotating connector according to claim 1, wherein the edge of the connecting end portion of the flexible cable is lifted by the stationary side connecting portion of the first housing to prevent the edge of the connecting end portion of the flexible cable and the outer extension portion of the movable body from contacting each other.

5. A rotating connector according to claim 1, wherein an end of the outer extension portion extends upward.

6. A rotating connector according to claim 5, wherein the edge of the connecting end portion of the flexible cable has a cutout formed therein to prevent the edge of the connecting end portion of the flexible cable and the outer extension portion of the movable body from contacting each other.

7. A rotating connector according to claim 5, wherein the edge of the connecting end portion of the flexible cable is lifted by a portion of the first housing to prevent the edge of the connecting end portion of the flexible cable and the outer extension portion of the movable body from contacting each other.

8. A rotating connector according to claim 5, wherein the edge of the connecting end portion of the flexible cable is lifted by the stationary side connecting portion of the first housing to prevent the edge of the connecting end portion of the flexible cable and the outer extension portion of the movable body from contacting each other.

* * * * *

UNITED STATES PATENT AND TRADEMARK OFFICE
CERTIFICATE OF CORRECTION

PATENT NO. : 6,224,406 B1
DATED : May 1, 2001
INVENTOR(S) : Seishi Takahashi et al.

It is certified that error appears in the above-identified patent and that said Letters Patent is hereby corrected as shown below:

<u>Title page,</u>
After Item [22], insert a new item as follows:
-- Foreign Application Priority Data
July 9, 1998 [JP]    10-187533 --.

Signed and Sealed this

Sixteenth Day of July, 2002

Attest:

Attesting Officer

JAMES E. ROGAN
*Director of the United States Patent and Trademark Office*